United States Patent
Skarby

(10) Patent No.: US 9,246,324 B2
(45) Date of Patent: Jan. 26, 2016

(54) CIRCUIT BREAKER WITH STACKED BREAKER MODULES

(71) Applicant: ABB Technology AG, Zurich (CH)

(72) Inventor: Per Skarby, Wurenlos (CH)

(73) Assignee: ABB TECHNOLOGY AG, Zurich (CH)

(*) Notice: Subject to any disclaimer, the term of this patent is extended or adjusted under 35 U.S.C. 154(b) by 0 days.

(21) Appl. No.: 14/679,806

(22) Filed: Apr. 6, 2015

(65) Prior Publication Data

US 2015/0214724 A1 Jul. 30, 2015

Related U.S. Application Data

(63) Continuation of application No. PCT/EP2013/070580, filed on Oct. 2, 2013.

(30) Foreign Application Priority Data

Oct. 5, 2012 (EP) ..................................... 12187368

(51) Int. Cl.
*H02H 3/00* (2006.01)
*H02H 3/20* (2006.01)
*H01H 9/54* (2006.01)
*H01H 33/59* (2006.01)
*H01H 89/00* (2006.01)

(52) U.S. Cl.
CPC .................. *H02H 3/20* (2013.01); *H01H 9/542* (2013.01); *H01H 33/596* (2013.01); *H01H 89/00* (2013.01)

(58) Field of Classification Search
USPC ................................................ 361/8–12, 115
See application file for complete search history.

(56) References Cited

U.S. PATENT DOCUMENTS

| 3,430,062 | A | 2/1969 | Roth |
| 5,650,901 | A | 7/1997 | Yamamoto |
| 6,535,366 | B1 | 3/2003 | Fröhlich et al. |
| 2008/0077360 | A1* | 3/2008 | DeBoer ................. G04C 23/26 702/188 |

FOREIGN PATENT DOCUMENTS

| DE | 20 2011 051 561 U1 | 9/2012 |
| JP | 200-260271 A | 9/2000 |
| JP | 2008-301089 A | 12/2008 |
| WO | WO 2011/050832 A1 | 5/2011 |
| WO | WO 2011/057675 A1 | 5/2011 |

OTHER PUBLICATIONS

International Search Report (PCT/ISA/210) mailed on Nov. 20, 2013, by the European Patent Office as the International Searching Authority for International Application No. PCT/EP2013/070560.

(Continued)

*Primary Examiner* — Danny Nguyen
(74) *Attorney, Agent, or Firm* — Buchanan Ingersoll & Rooney PC

(57) ABSTRACT

A circuit breaker is disclosed which includes a plurality of stacked breaker modules arranged in series. Each breaker module can include, in parallel, a mechanical switching assembly, a semiconductor switching assembly and an arrester assembly. The circuit breaker can easily be adapted to a larger number of applications and voltage ranges by varying the number of breaker modules.

25 Claims, 5 Drawing Sheets

(56) References Cited

OTHER PUBLICATIONS

Written Opinion (PCT/ISA/237) mailed on Nov. 20, 2013, by the European Patent Office as the International Searching Authority for the International Application No. PCT/EP2013/070560.

International Preliminary Report on Patentability (PCT/IPEA/409) mailed on Oct. 22, 2014, by the European Patent Office as the International Searching Authority for International Application No. PCT/EP2013/070560.

European Search Report for EP 12187368.1 dated Mar. 1, 2013.

* cited by examiner

CIRCUIT BREAKER WITH STACKED BREAKER MODULES

TECHNICAL FIELD

The invention resides in the field of electrical energy transmission and distribution. It relates to a circuit breaker comprising a stack of a plurality of breaker modules. The invention also relates to a use of such a circuit breaker.

BACKGROUND ART

WO 2011/050832 describes a high-voltage circuit breaker comprising at least two breaker sections connected in series.

WO 2011/057675 describes a high-voltage circuit breaker comprising, in one embodiment, a plurality of mechanical switches as well as a plurality of transistors.

U.S. Pat. No. 6,535,366 describes a high-voltage circuit breaker that comprises a combination of mechanical and semiconductor switches arranged in parallel.

DISCLOSURE OF THE INVENTION

It is an object of the present invention to provide a circuit breaker that is able to switch large voltages while still being economical in production.

This object is achieved by the circuit breaker of the independent claim 1. Accordingly, the circuit breaker comprises a stack of a plurality of stacked breaker modules electrically arranged in series, such that the applied voltage is distributed over the breaker modules. Each breaker module comprises
- a mechanical switching assembly with a mechanical switch,
- a semiconductor switching assembly comprising a semiconductor switch, and
- an arrester assembly comprising at least one surge arrester.

Within each breaker module, the mechanical switching assembly, the semiconductor switching assembly and the arrester assembly are electrically arranged parallel to each other. This makes it possible to use the mechanical switching assembly in its on-state in normal operation and, for switch-off, to switch the current within each module first to the semiconductor switching assembly and then by turning off the semiconductor switching assembly for commutating the current to the arrester assembly.

In a current limitation mode the breaker modules are switchable in an intermediary state such that a current path across the stack is guided through the arrester assembly in a first amount of breaker modules and through the mechanical switching assembly in a second amount of breaker modules.

Costs for producing such circuit breakers are reduced, because the modules are all identical and are required in large numbers, which allows to exploit mass production techniques and economies of scale. Further, each module can have a comparatively low voltage rating. The circuit breaker can be scaled to different voltage ratings by varying the number of breaker modules arranged in series.

In embodiments, each breaker module comprises a first contact surface connected to a first terminal of the mechanical switching assembly, a first terminal of the semiconductor switching assembly and a first terminal of the arrester assembly. The breaker module further comprises a second contact surface connected to a second terminal of the mechanical switching assembly, a second terminal of the semiconductor switching assembly and a second terminal of the arrester assembly. The first and second contact surfaces are located on opposite sides of their breaker module. This allows to stack the breaker modules easily in such a manner that the contact surfaces of neighboring breaker modules in the stack are electrically connected to each other.

By mechanically compressing the stack, e.g. by means of a mechanical spring, a low electrical resistance and good thermal conductivity between the modules is achieved.

In another embodiment, each mechanical switching assembly comprises a power supply for actuating the switching assembly. Furthermore, the circuit breaker comprises a galvanically insulated power feeder for feeding power to the power supplies. This design allows to keep the power supply of each mechanical switching assembly at the electrical potential of the mechanical switching assembly, which reduces costs and improves modularity.

The power feeder can e.g. be an optical power feeder, a mechanical power feeder or a hydraulic or pneumatic power feeder, as will be explained in more detail below.

The circuit breaker of the present invention is for example used for switching voltages of at least 72 kV, and in particular for switching DC voltages, but it can e.g. also be used for switching voltages in the medium or even low voltage regime or for switching AC voltages.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Definitions

The term "high voltage" designates voltages exceeding 72 kV. The term "medium voltage" designates voltages between 1 kV and 72 kV. The term "low voltage" designates voltages below 1 kV.

A "galvanically insulated power feeder" is a feed for feeding electrical power from ground potential to an elevated high voltage potential.

Circuit Breaker and Breaker Modules

Figure 1:
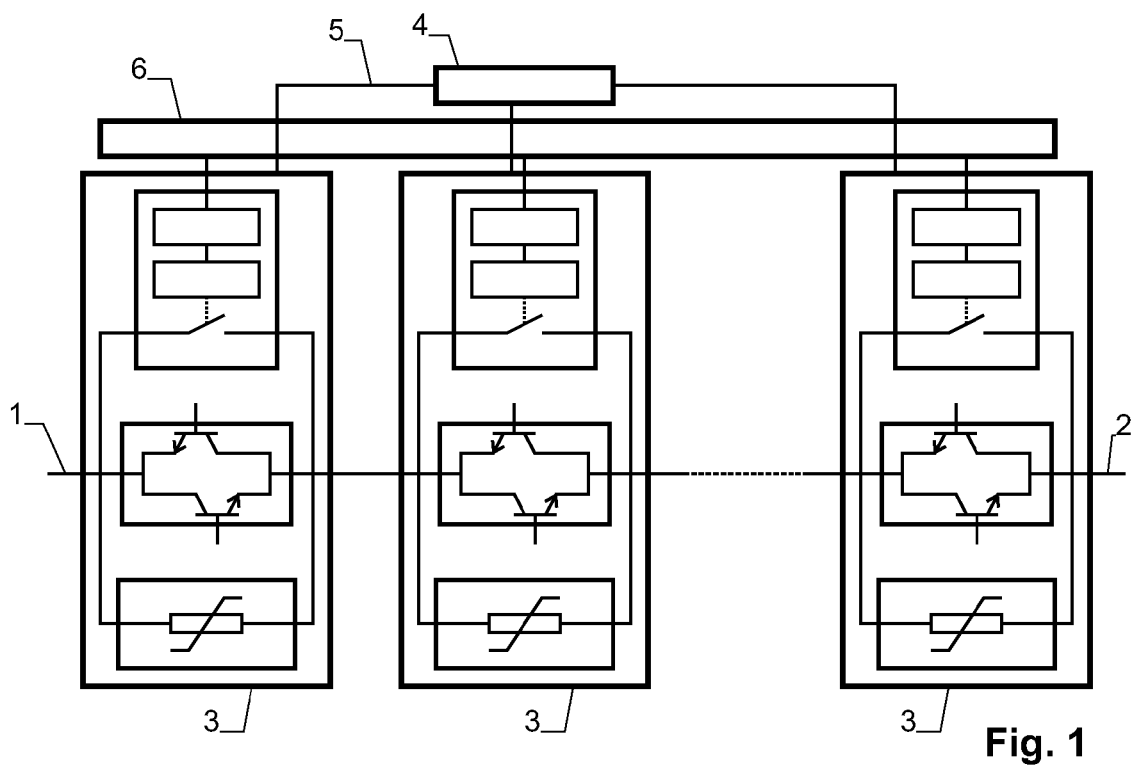
FIG. 1 is a block circuit diagram of a circuit breaker.

FIG. 1 shows the most important components of an embodiment of a circuit breaker. It comprises a first terminal 1 and a second terminal 2, which are connected to a power line to be switched. A plurality of essentially identical breaker modules 3 are arranged in series between the first circuit breaker terminal 1 and the second circuit breaker terminal 2. A control unit 4 is provided for controlling the operation of the individual breaker modules 3 and is connected to them, e.g. by means of optical fibers 5 for reasons that will become apparent below. Controlling the operation of the individual breaker modules 3 is understood as a selective tripping of the modules allowing for switching the individual breaker modules 3 individually from one another such that a total counter voltage is adjustable by the number of breaker modules 3 that are tripped. Finally, FIG. 1 shows the circuit breaker to comprise a galvanically insulated power feeder 6 adapted to feed power to the power supplies of the mechanical switching assemblies, which will described in more detail below.

Figure 2:
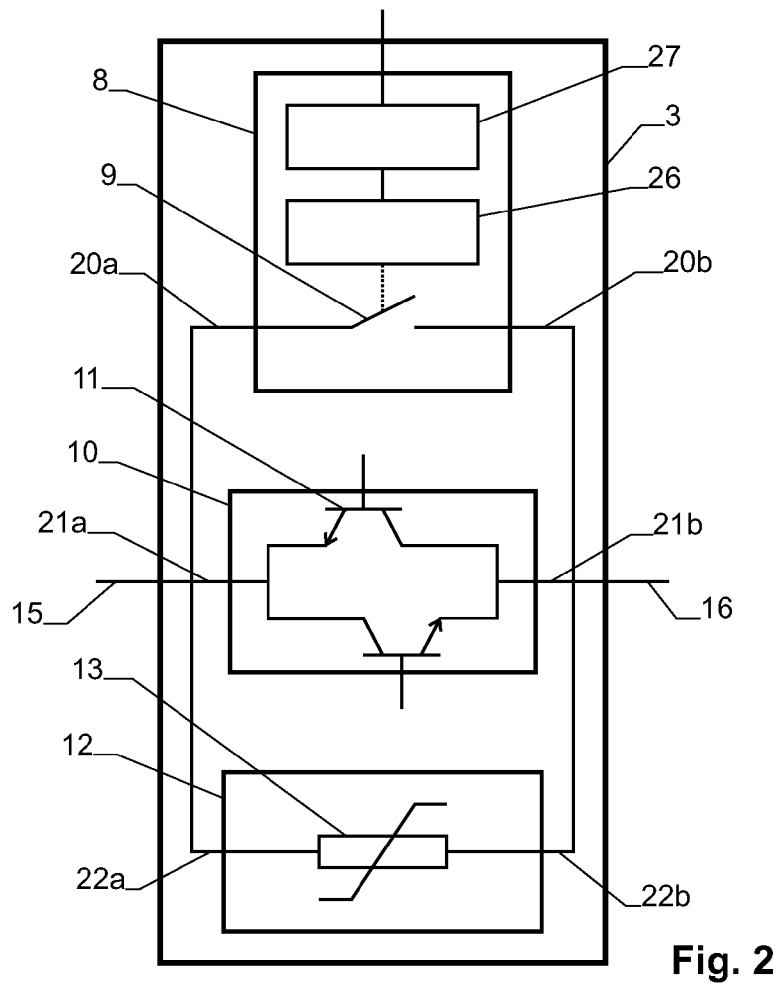
FIG. 2 is block circuit diagram of an embodiment of a breaker module.

FIG. 2 shows a block circuit of a breaker module 3. The module comprises three main parts, namely:

- a mechanical switching assembly 8 comprising at least one mechanical switch 9,
- a semiconductor switching assembly 10 comprising at least one semiconductor switch 11, and
- an arrester assembly 12 comprising at least one surge arrester 13.

These three assemblies are arranged electrically parallel to each other between a first contact surface 15 and a second contact surface 16 of the breaker module 3 which form electrical terminals for each module.

Figure 3:
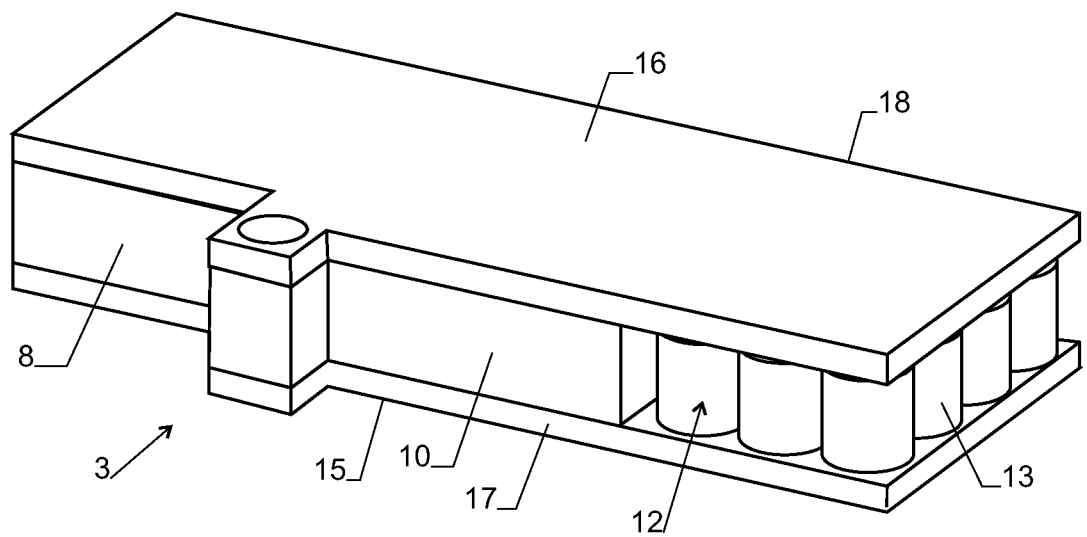
FIG. 3 shows a view of an embodiment of a breaker module.
Figure 4:
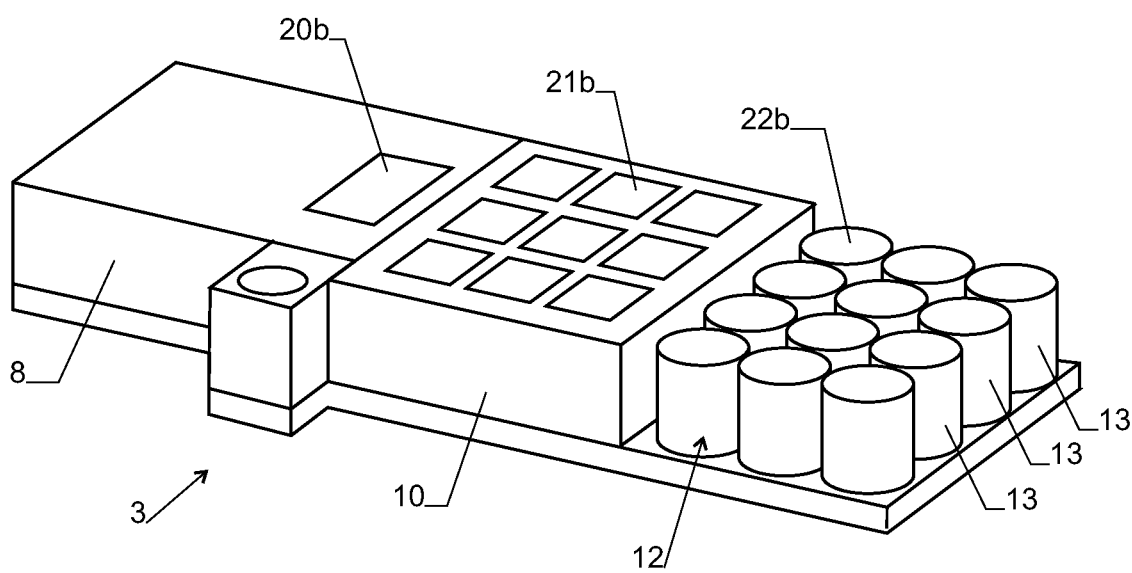
FIG. 4 shows the breaker module of FIG. 3 without its upper plate, i.e. without its upper electrical terminal.

FIGS. 3 and 4 show an exemplary mechanical design of the breaker module 3. As can be seen, it comprises a bottom plate 17 and a top plate 18, with top plate 18 not being shown in FIG. 4. In the embodiment of FIGS. 3 and 4, these plates 17, 18 are shown to be flat, but they may also be structured, e.g. in order to facilitate a self-aligned stacking of the breaker modules 3. Advantageously, at least part of the outer surfaces of the plates 17, 18 is metallic. Bottom plate 17 forms the first contact surface 15, while top plate 18 forms the second contact surface 16. The first and second contact surfaces 15, 16 are arranged on opposite sides of the breaker module 3.

As can be seen in FIG. 2 and, in part, in FIG. 4, the first contact surface 15 is electrically connected to a first terminal 20*a* of the mechanical switching assembly 8, to a first terminal 21*a* of the semiconductor switching assembly 10 and to a first terminal 22*a* of the surge arrester assembly 12. Similarly, the second contact surface 16 is electrically connected to a second terminal 20*b* of the mechanical switching assembly 8, to a second terminal 21*b* of the semiconductor switching assembly 10 and to a second terminal 22*b* of the surge arrester assembly 12.

Figure 5:
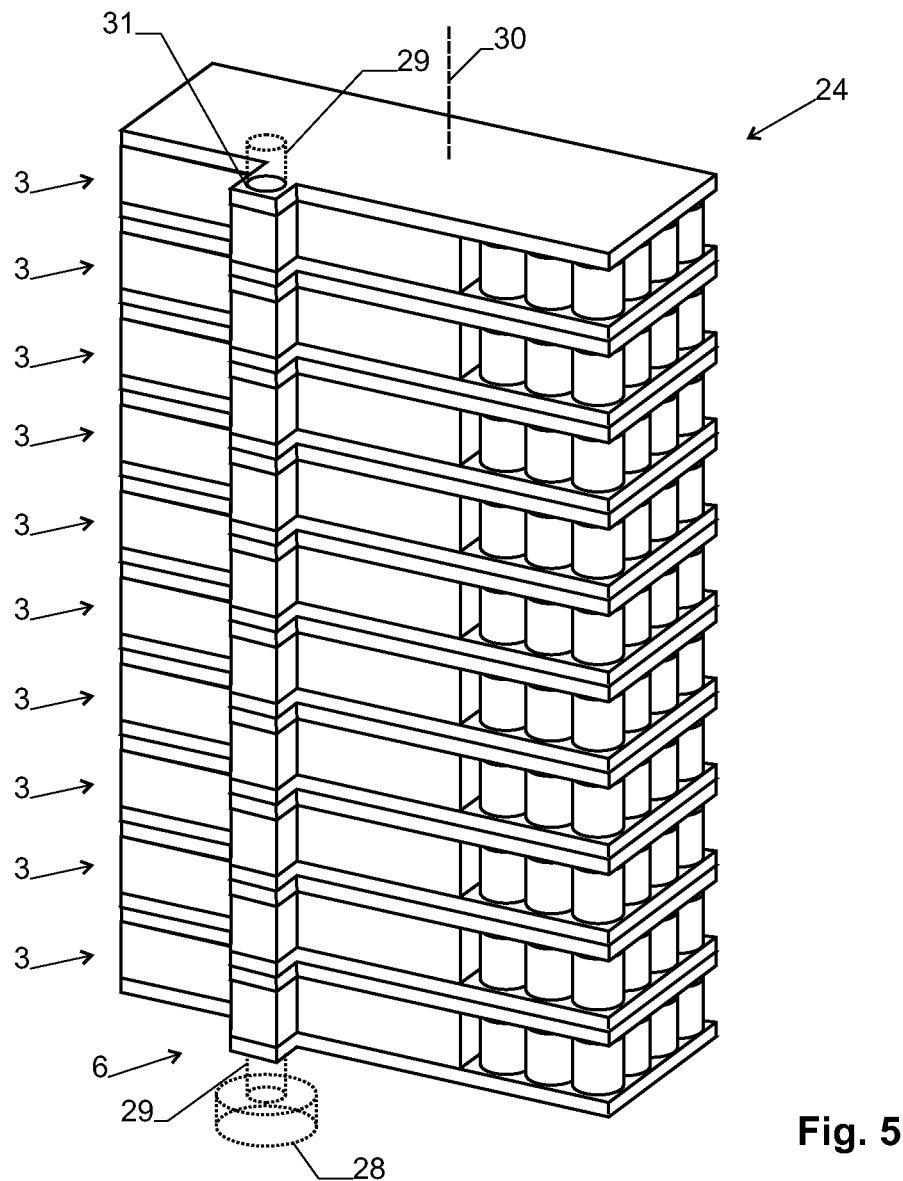
FIG. 5 shows a circuit breaker with a stack of breaker modules.

As shown in FIG. 5, the breaker modules 3 are arranged in a stack 24. It should be noted that the stack may have arbitrary orientation and can e.g. extend vertically or horizontally. In the shown embodiment, the contact surfaces 15, 16 of neighboring breaker modules 3 in the stack 24 are abutting against each other and are therefore electrically connected to each other. Alternatively, a conducting intermediate member may be present between each two breaker modules 3.

In the following, the assemblies 8, 10 and 12 are described in more detail.

Mechanical Switching Assembly

As mentioned herein, the mechanical switching assembly 8 comprises at least one switch 9. An actuator (see FIGS. 6 and 7) is provided for actuating the switch 9. The actuator 26 should for example be able to operate switch 9 quickly, for example in the milliseconds range.

The actuator 26 should for example be based on a repulsive actuation concept, such as the Thomson effect, in order to reach the high opening speeds. A suitable design is e.g. described in U.S. Pat. No. 7,235,751 and, in particular, in FIGS. 23, 24 therein.

Figure 6:
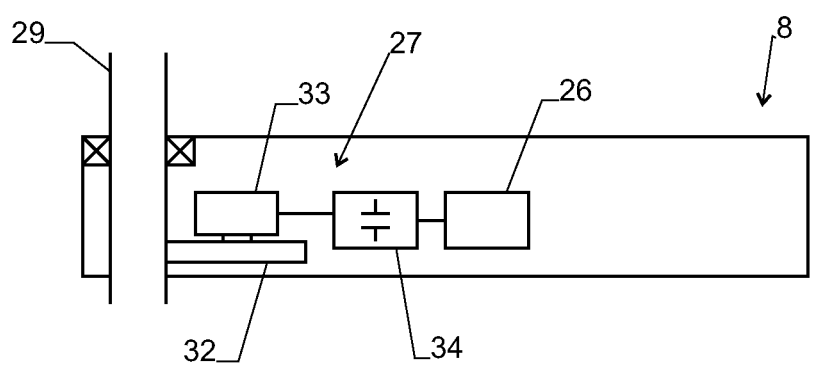
FIG. 6 is a schematic view of the power supply section of a mechanical switching assembly.

Each mechanical switching assembly 8 has a power supply 27, as shown in FIG. 6, in particular for operating the actuator 26. Since the breaker modules 3 are usually at medium or high voltage potential during operation of the switch 8, a galvanically insulated power feeder 6 is provided for feeding power to the power supplies 27.

FIGS. 5 and 6 show one embodiment of such a high-voltage insulated power feeder 6 that feeds the power mechanically to the individual breaker modules 3. In the shown embodiment, the power feeder 6 comprises a drive 28 at ground potential and an insulating shaft 29 of suitable length. The drive 28 can be operated to rotate the shaft 29 about its longitudinal axis. This longitudinal axis extends parallel to the stacking direction 30 of the stack 24.

The shaft 29 passes through an opening 31 in each breaker module 3. The outer side of the shaft 29 is provided with teeth. These teeth are engaged by a gear wheel 32 rotatably arranged in each breaker module 3. The gear wheel 32 drives an electrical generator 33, which converts the rotation of the shaft 29 into an electrical current. This electrical current is fed to a power storage unit 34, which stores the electrical energy received from the power feeder 6. The power storage unit 34 may e.g. be a capacitor or an accumulator. Using a power storage unit 34 allows to quickly release a large amount of energy for switching the mechanical switching assembly 8 even if the power level that can be fed through the power feeder 6 is comparatively low.

The power from power supply 27 can be used to operate not only the mechanical switching assembly 8, but it can also feed any necessary operating current to the semiconductor switching assembly 10 as well as to any further electrical components, such as signal amplifiers or sensors located in the breaker module 3.

Alternatively to using a mechanical power feeder 6, as shown in FIGS. 5 and 6, an optical power feeder can be used, similar to e.g. optical gate unit powering. In this case, power feeder 6 comprises a light source and each power supply 27 comprises a photocell for converting power from the light source to an electrical current.

In yet another embodiment, the power feeder 6 can comprise a number of capacitors arranged in series in order to transmit AC power while decoupling DC or low-frequency AC potentials, see e.g. US 2006/0152199.

In yet another embodiment, power feeder 6 can comprise a fluid duct and a pump for pumping a fluid through the duct. The duct passes each beaker module 3. Each power supply 27 comprises a small turbine driving a generator for converting the flow of the fluid to an electrical current. The fluid, which can be a liquid or air, can, at the same time, be used for cooling the breaker modules 3. The fluid shall be a dielectric medium.

The design of the switch 9 and its actuator should be optimized for speed and be adapted to the voltage ratings of the breaker modules 3.

As mentioned above and shown in FIGS. 7 and 8, the actuator 26 is for example a Thomson drive as described in U.S. Pat. No. 7,235,751.

Figure 7:
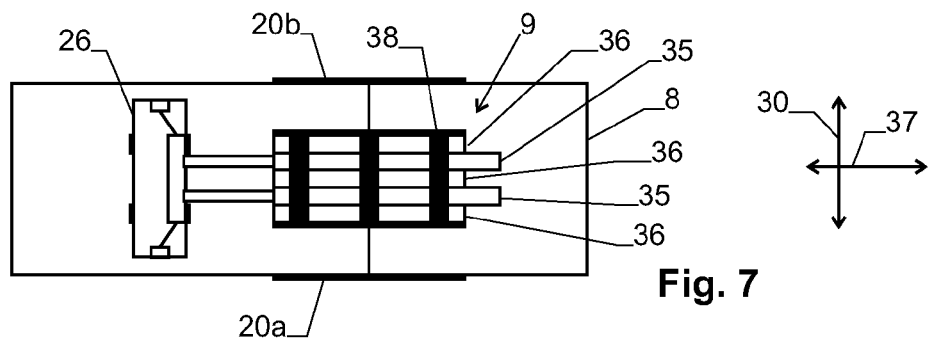
FIG. 7 is a schematic sectional view of a switch in a mechanical switching assembly in its on-position.
Figure 8:
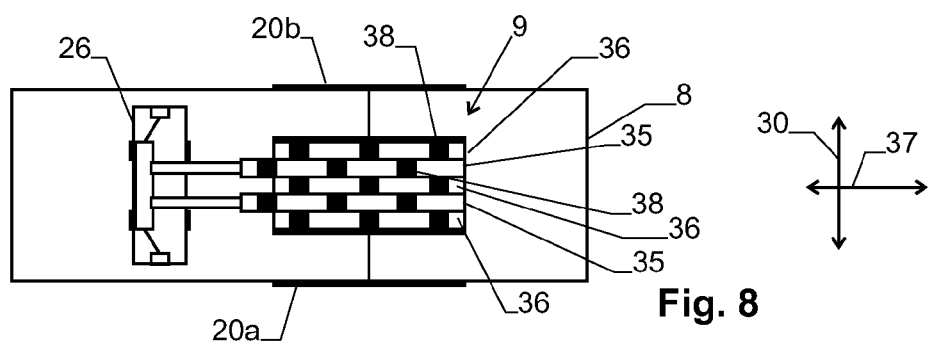
FIG. 8 is a schematic sectional view of the switch of FIG. 7 in its off-position.

The switch 9 can be light-weight with segmented contacts, which allows to achieve fast switching with low switching energies. In one embodiment, the switch 9 is built using the design described in U.S. Pat. No. 7,235,751, with at least one first and at least one second contact member. In the embodiment of FIGS. 7 and 8, two first contact members 35 and three second contact members 36 are provided. They are mutually displaceable by means of the actuator 26 in a direction 37 transversally, in particular perpendicularly, to the stacking direction 30, which allows to achieve a compact design. As described in U.S. Pat. No. 7,235,751, each contact member 35, 36 carries through-contacts 38, which are aligned to form contacting paths between the terminals 20a, 20b, when the contact members 35, 36 are in the on-position (FIG. 7), but not when they are in the off-position (FIG. 8).

Semiconductor Switching Assembly

The transistors used in semiconductor switching assembly 10 are for example BiGT (Bi-directional IGBT), thereby avoiding paralleling of the standard IGBT/diode combination to obtain reverse blocking capability. Other semiconductors switches of turn-off type can be used, as well.

Figure 9:
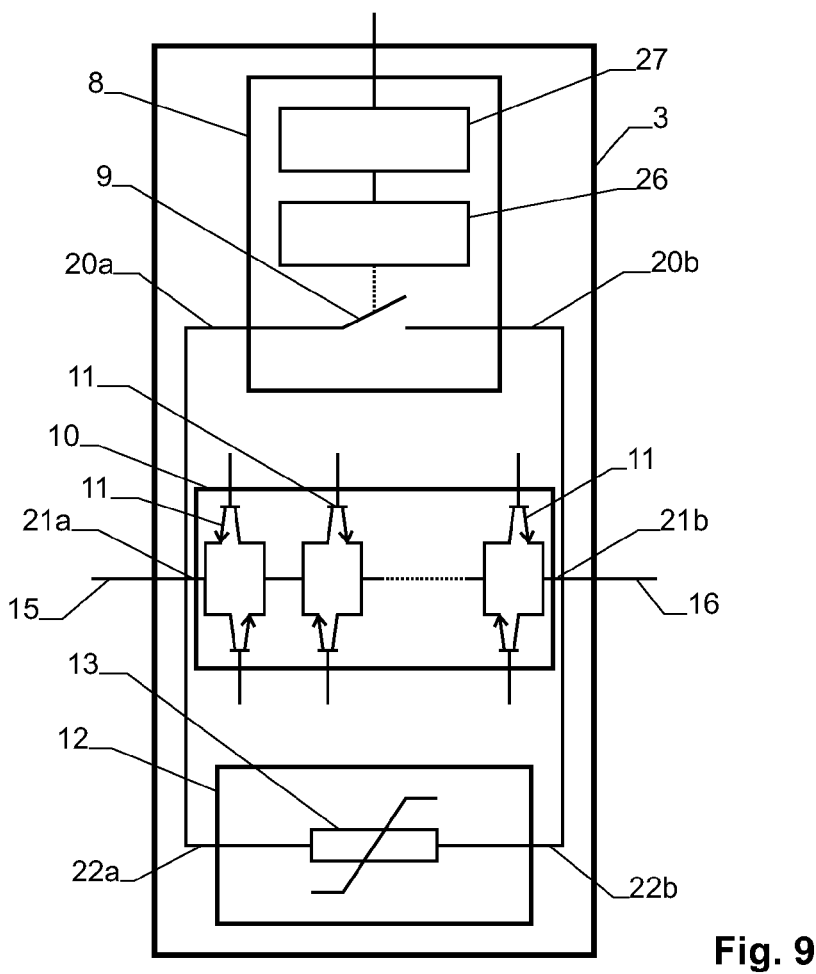
FIG. 9 is a block circuit diagram of a second embodiment of a breaker module.

Depending on the current and voltage ratings of the breaker modules 3, each semiconductor switching assembly 10 can also comprise a plurality of semiconductor switches 11 arranged in series and/or in parallel. FIG. 9 shows an embodiment of a breaker module 3 with a plurality of semiconductor switches 11 in series, while FIG. 4, which shows a plurality of terminals 21b, represents a design with several transistors 11 (or series of transistors 11) arranged in parallel.

Arrester Assembly

Arrester assembly 12 comprises one or more varistors 13 or surge arresters 13. FIG. 4 shows an example that comprises twelve such varistors 13 arranged in parallel. Depending on the desired clamping voltage of each breaker module 3 and on the amount of the dissipated energy, the number of connected varistor elements 13 in series and parallel may be varied.

Applications, Usage

Some applications of the circuit breaker described herein are the following:
  DC Breakers for multi-terminal on-shore, off-shore or subsea high-voltage DC systems.
  DC Breakers for medium voltage (e.g. 1.5 kV-40 kV), e.g. in distributed wind turbine generators.
  Fast and low-loss breakers for UPS (uninterrupted power supply) devices and/or for power quality devices for sensitive industrial environment or loads.
  AC medium voltage current limiters for, e.g., traction power systems, where the short-circuit power and current in existing installations is reached and further extension is necessary.
  High-end low-voltage breakers, i.e. in systems where mechanical low-voltage DC breakers have insufficient performance, e.g. in large photovoltaic installations.

Generally, in DC electrical networks based on voltage source conversion (VSC), where fault current blocking through the rectifier or converter is limited or even impossible, it is paramount to interrupt the fault current quickly, before it has reached too high levels. Typically, the interruption needs to be facilitated by additional inductance, e.g. in fault current limiting reactors. In terms of both interruption speed and current level, power semiconductors, such as the IGBT, have been shown to be very capable of fault current interruption up to several times (8-10×) the maximum nominal current (typically 1300 A). This is typically exploited by arranging several power semiconductors in series. The drawback of the on-state losses and active cooling requirement of such a semi-conductor stack can be reduced by means of a mechanically switched by-pass path in parallel to the power semiconductor, as described in WO2011057675, where additionally, the by-pass branch is fitted with an auxiliary semiconductor commutation switch. This facilitates fast commutation and contact separation at nearly zero current for the mechanical by-pass switch and enables high voltage ratings to be reached with one mechanical switching unit.

Limiting a fault current in an AC network is nearly analogous to DC fault current interruption. The lack of a DC residual current and the likelihood of current zero crossings that can be used by the interrupter make this duty easier than for DC. In case that the network impedance is too low, the rate of raise of the fault current may have to be controlled so that the time to current limitation can be matched with the technical specification of the breaker module.

Instead of having one single common mechanical by-pass switch for all semiconductor switches, the present concept relies on attributing one mechanical switching assembly to each (or a small group) of semiconductor switches. At first glance, this may seem an expensive and difficult solution, but the concept offers a number of advantages as described herein.

Limiting or "interrupting" a fault current in an AC or DC network by means of the current breaker described herein can be done the following way:
  In normal operation, the nominal current is conducted by the mechanical switching assemblies 8.
  In case of a fault, the current is commutated into every semiconductor switching module 10, which at this instance are in their on-state. The final commutation into each arrester assembly 12 is then attained by turning off the semiconductor switching assemblies 10 in every breaker module 3.

Depending on the number of breaker modules 3 that are tripped, i.e. where the current is commutated into the semiconductor switching assembly 10, the counter voltage is easily adjustable and hence the fault current decay and dissipation of energy can be controlled or even actively modulated in a post-fault transition time, i.e. by switching the modules 3 either in a pre-determined pattern or by means of a control feedback of suitable signals, such as voltage and current at near-breaker locations or at more remote locations.

Figure 10:
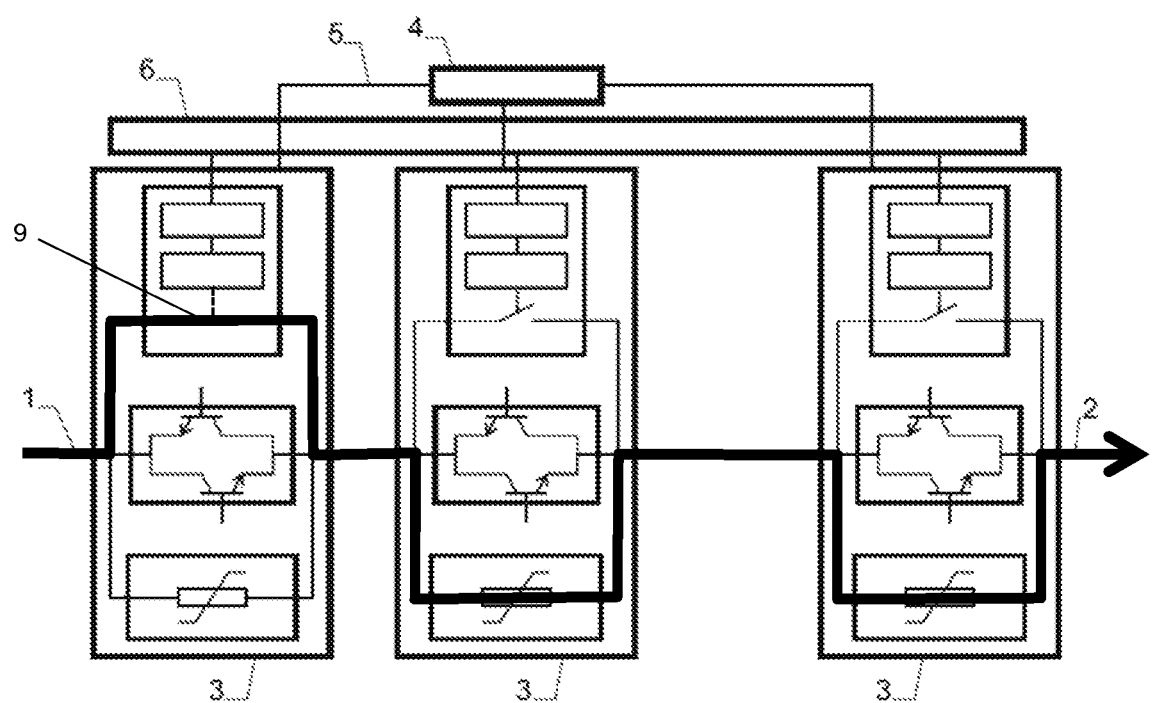
FIG. 10 shows the current path through the breakers modules of the circuit breaker according to FIG. 1 in a current limitation mode.

In a current limitation mode the breaker modules are switchable in an intermediary state such that a current path across the stack is guided through the arrester assembly in a first amount of breaker modules and through the mechanical switching assembly in a second amount of breaker modules such as shown in FIG. 10. In said first amount of breaker modules the mechanical switching assembly is opened such that the current is conducted through the arrester assembly each after being commutated into the semiconductor switching assembly each. In said second amount of breaker modules the mechanical switching assembly is retained in its on-state for conducting the current via its through-contacts, each. The terms first/second amount of breaker modules is understood as an integer number of breaker modules of the circuit breaker wherein the sum of first amount of breaker modules and second amount of breaker modules equals to a total number of breaker modules of the circuit breaker.

The term intermediary state is understood as a limited amount of time during which a control unit provided for controlling the operation of the individual breaker modules takes a decision on how to pursue. Depending on said decision the first amount of breaker modules may be required to revert to their normal operation mode within a predetermined period of time after current interruption or current limiting.

Notes

Each breaker module 3 forms a mechanical unit, i.e. it can be removed from the circuit breaker as a whole and retains, in its removed state, its mechanical integrity. This can, e.g., be achieved by providing each breaker module 3 with a frame (e.g. formed by the lower plate 17) and by mounting the mechanical switching assembly 8, the semiconductor switching assembly 10 and the arrester assembly 12 to this frame 17.

By using a sufficiently large number of breaker modules 3, the low voltage over each module enables a short switching gap in the mechanical switching assembly 8 and therefore allows using light-weight contacts, hence the energy storage unit 34 can be designed with relatively low storage capacity. Furthermore, lowcost, mass-produced electrical components (such as e.g. low-voltage capacitors and thyristors) can be used.

When the current through the circuit breaker is to be interrupted, e.g. for breaking a fault current, commutation takes place in each breaker module 3 and is a relatively easy duty, since the forward voltage drop in the on-state of the mechanical breaker assembly 8 is very low and the stray inductances for the closely located assemblies 8 and 10 are small. For example, in order to commutate 4.5 kA against a stray inductance of 1 µH within 100 µs results in a 45 V inductive voltage drop.

In embodiments, the modules are designed to reach the rated nominal current by means of passive cooling, but a cooling system realized by e.g. forced air convection or forced liquid flow is also possible, for example such as the one described herein in combination with the fluid power feeding system.

Each breaker module 3 can comprise a local control unit for operating and monitoring the assemblies 8, 10 and 12.

For medium- to high-voltage applications, the number of breaker modules 3 is typically at least 10, in particular is in the range of 10-100 breaker modules 3. To avoid too large stacks 24, a clustering of 10-30 breaker modules 3 in one stack 24 can be chosen.

The circuit breaker or switch can be adapted to applications over a wide voltage range. For each application, the same breaker modules 3 can be used, and their number is adapted to the required voltage to be switched. A single breaker module 3 can e.g. be built for switching voltages up to 3 kV, such that a 300 kV circuit breaker can be built using approximately 100 breaker modules 3.

In embodiments, the circuit breaker or switch has a built-in feature such that in case of a mechanical failure, the switch shall remain closed or shall quickly assume the closed position. It could be possible to use the arc energy to ensure this by means of magnetic coil actuation or by thermal propulsion.

In the embodiments described herein, the power feeder 6 has been arranged parallel to the stack 24 of the breaker modules 3. Alternatively, power may be fed in series through the modules 3.

An important aspect of the above design lies in the collection of all the present and future needs of various applications and to design a breaker module 3, i.e. a "building block" 3, which exploits the technical similarities common to all these applications. The large number of identical breaker modules 3 required for all applications drives costs down. A further beneficial side-effect is a more homogeneous installation base.

While there are shown and described presently preferred or advantageous or beneficial embodiments of the invention, it is to be distinctly understood that the invention is not limited thereto, but may be otherwise variously embodied and practiced within the scope of the following claims.

REFERENCE NUMBERS

1, 2: first and second circuit breaker terminals
3: breaker module
4: control unit
5: optical fibers
6: power feeder
8: mechanical switching assembly
9: mechanical switch
10: semiconductor switching assembly
11: semiconductor switch
12: arrester assembly
13: surge arrester
15, 16: contact surfaces
17, 18: bottom and top plates, frame
20a, 20b: terminals of the mechanical switching assembly
21a, 21b: terminals of the semiconductor switching assembly
22a, 22b: terminals of the arrester assembly
24: stack
26: actuator
27: power supply
28: power feeder
30: stacking direction
31: opening
32: gear wheel
33: generator
34: power storage unit
35, 36: first and second contact members
37: direction of displacement
38: through-contacts

The invention claimed is:

1. A circuit breaker comprising:
   a stack of a plurality of stacked breaker modules electrically arranged in series in a current path between a first terminal and a second terminal of the circuit breaker, wherein each breaker module includes:
   a mechanical switching assembly having a mechanical switch;
   a semiconductor switching assembly having a semiconductor switch; and
   an arrester assembly having at least one surge arrester;
   wherein the mechanical switching assembly, the semiconductor switching assembly and the arrester assembly are electrically arranged parallel to each other, and
   wherein the individual breaker modules are selectively trippable for switching the individual breaker modules individually from one another such that a total counter voltage is adjustable by a number of breaker modules that are tripped.

2. The circuit breaker of claim 1, wherein each breaker module comprises:
   a first contact surface connected to a first terminal of the mechanical switching assembly, to a first terminal of the semiconductor switching assembly and to a first terminal of the arrester assembly; and
   a second contact surface connected to a second terminal of the mechanical switching assembly, to a second terminal of the semiconductor switching assembly and to a second terminal of the arrester assembly,
   wherein each of the first and the second contact surfaces are located on opposite sides of their breaker module, and wherein the contact surfaces of neighboring breaker modules in the stack are electrically connected to each other.

3. The circuit breaker of claim 1, wherein each mechanical switching assembly includes a power supply, and wherein the circuit breaker comprises:
   a galvanically insulated power feeder for feeding power to the power supplies.

4. The circuit breaker of claim 3, wherein the power feeder comprises:
   a light source, and wherein each power supply includes a photocell for converting power from the light source to an electrical current.

5. The circuit breaker of claim 3, wherein the power feeder comprises:
a drive and a shaft rotatable by the drive, wherein each power supply includes a generator for converting a rotation of the shaft to an electrical current.

6. The circuit breaker of claim 3, wherein the power feeder comprises:
a fluid duct and a pump for pumping a fluid through the duct, wherein each power supply includes a turbine and a generator for converting a flow of the fluid to an electrical current.

7. The circuit breaker of claim 3, wherein each power supply comprises:
a power storage unit for storing electrical energy received via the power feeder.

8. The circuit breaker of claim 1, comprising:
at least ten of the breaker modules.

9. The circuit breaker of claim 1, wherein each mechanical switching assembly comprises:
at least a first and a second contact member; and
an actuator configured to mutually displace the first and the second contact members in a direction transversally to a stacking direction of the breaker modules.

10. The circuit breaker of claim 1, wherein each semiconductor switching assembly comprises:
a plurality of semiconductor switches arranged in series and/or in parallel.

11. The circuit breaker of claim 1, wherein each arrester assembly comprises:
a plurality of varistors electrically arranged parallel to each other.

12. The circuit breaker of claim 1, wherein each breaker module forms a mechanical unit that is removable from the circuit breaker as a whole.

13. The circuit breaker of claim 12, wherein, each breaker module comprises:
a frame, and
wherein the mechanical switching assembly, the semiconductor switching assembly and the arrester assembly are mounted to the frame.

14. The circuit breaker of claim 1, wherein the mechanical switching assembly of each breaker module is configured for operation in its switched-on-state in normal operation for conducting a current, and
wherein a current within each breaker module can be switched-off by switching the current to the semiconductor switching assembly in its on-state first and then by switching to its off-state commutating the current to the arrester assembly.

15. The circuit breaker of claim 1, wherein in a current limitation mode the breaker modules are configured to be switchable in an intermediary state such that a current path across the stack will be guided through the arrester assembly in a first amount of breaker modules, and through the mechanical switching assembly in a second amount of breaker modules.

16. The circuit breaker of claim 1, comprising:
a control unit that is connected to the breaker modules.

17. The circuit breaker of claim 1, configured such that a fault current decay and dissipation of energy is controllable or can be actively modulated in a post-fault transition time by switching the modules in either a pre-determined pattern or based on local or remote current and voltage measurement signals.

18. The circuit breaker of claim 1, wherein the circuit breaker is configured to be scalable to different voltage ratings by varying a number of breaker modules arranged in series.

19. The circuit breaker of claim 1, configured for switching voltages of at least 1 kV.

20. The circuit breaker of claim 19, configured for switching voltages of at least 72 kV.

21. The circuit breaker of claim 19, wherein the switching voltages are DC voltages.

22. An AC or DC network comprising:
at least one circuit breaker according to claim 1.

23. The circuit breaker of claim 3, wherein each mechanical switching assembly comprises:
at least a first and a second contact member; and
an actuator configured to mutually displace the first and the second contact members in a direction transversally to a stacking direction of the breaker modules.

24. The circuit breaker of claim 23, wherein each semiconductor switching assembly comprises:
a plurality of semiconductor switches arranged in series and/or in parallel.

25. The circuit breaker of claim 24, wherein each arrester assembly comprises:
a plurality of varistors electrically arranged parallel to each other.

* * * * *